(No Model.) 6 Sheets—Sheet 3.
D. BAKER.
CASTING APPARATUS OR PLANT.

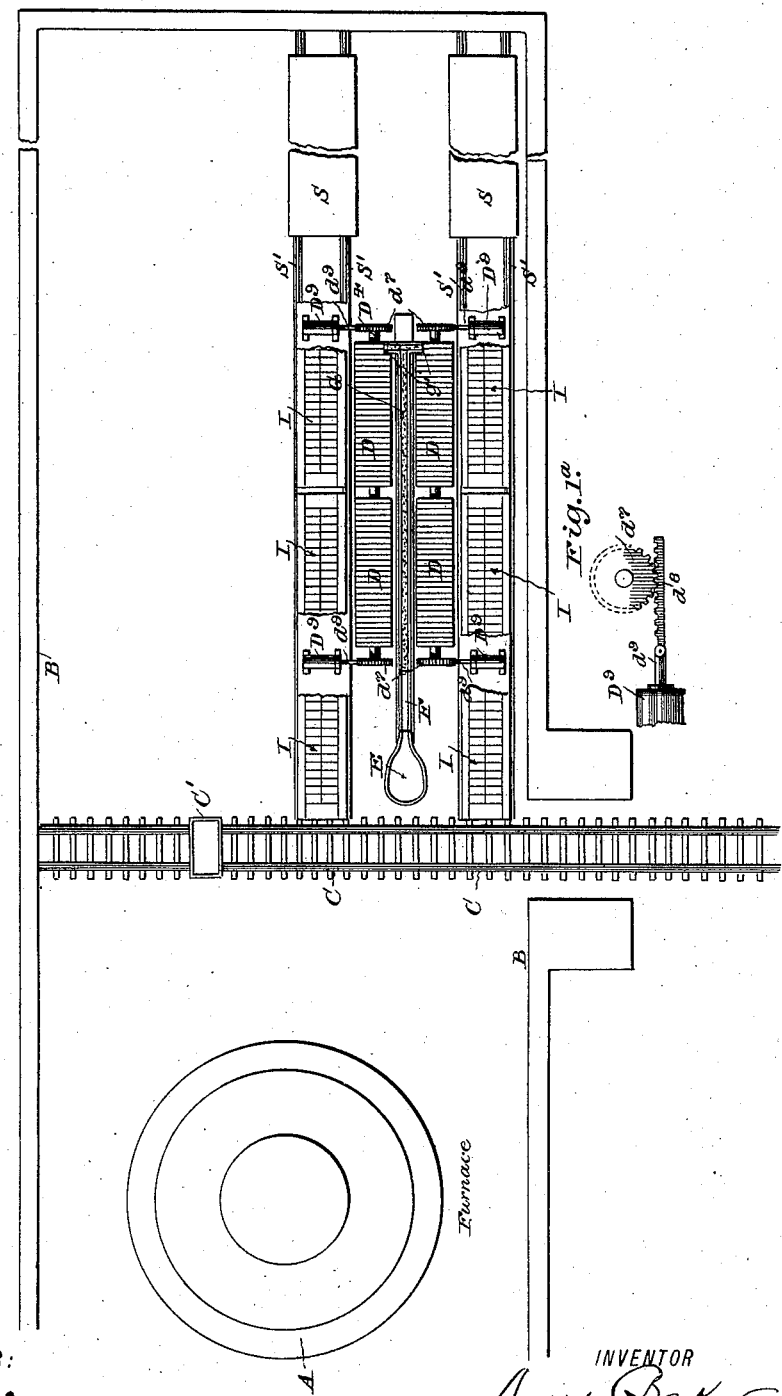

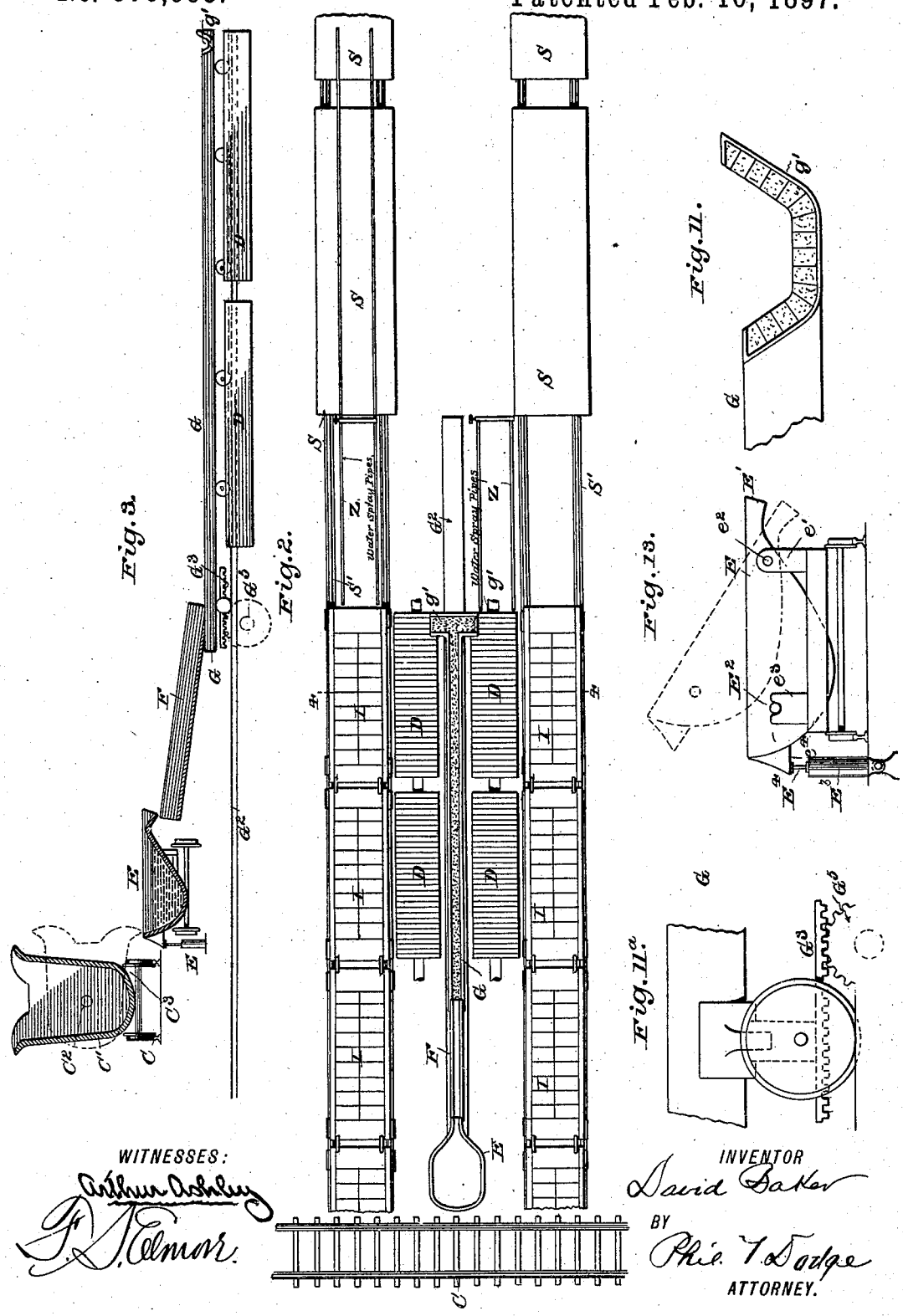

No. 576,995. Patented Feb. 16, 1897.

On line 4-4
of fig. 2.

WITNESSES:
Arthur Ashley
F. A. Elmore

INVENTOR
David Baker
BY
Phil. T. Dodge
ATTORNEY.

(No Model.) 6 Sheets—Sheet 4.
D. BAKER.
CASTING APPARATUS OR PLANT.
No. 576,995. Patented Feb. 16, 1897.
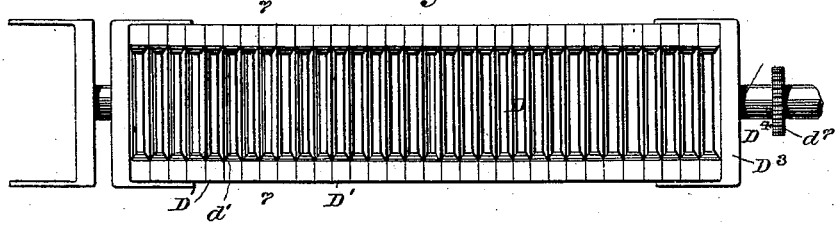
Fig. 6.
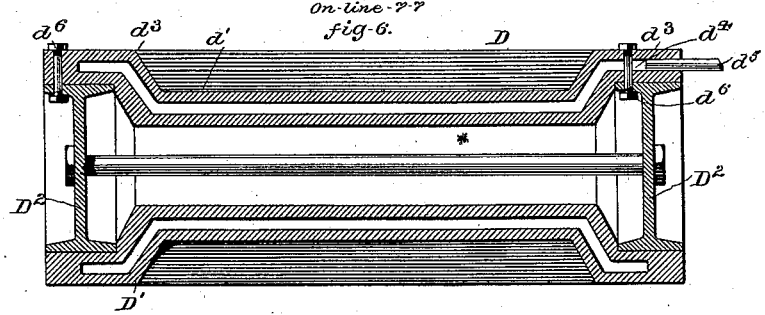
Fig. 7.
On line 7-7 fig. 6.
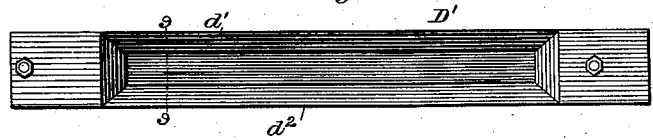
Fig. 8.
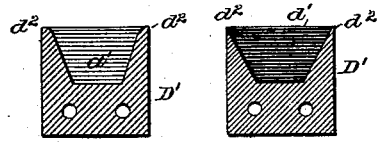
Fig. 9.ᵇ  Fig. 9.
On line 9-9 figure 8.
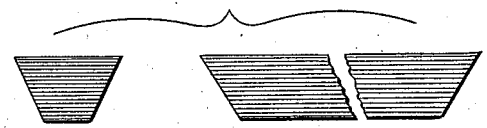
Fig. 9.ᵃ
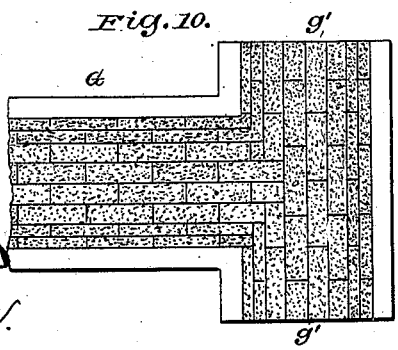
Fig. 10.
WITNESSES:
Arthur Ashley
F. S. Elmer
INVENTOR
David Baker
BY
Phil. T. Dodge
ATTORNEY.

(No Model.) 6 Sheets—Sheet 5.
D. BAKER.
CASTING APPARATUS OR PLANT.
No. 576,995. Patented Feb. 16, 1897.
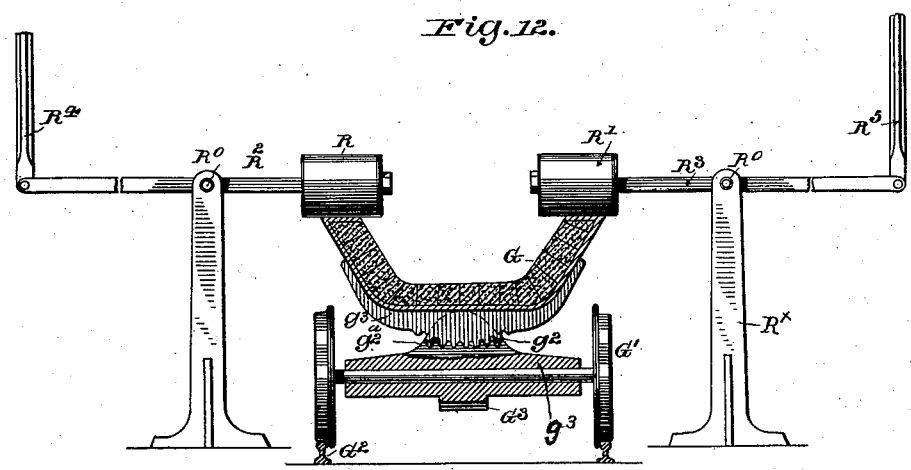
Fig. 12.
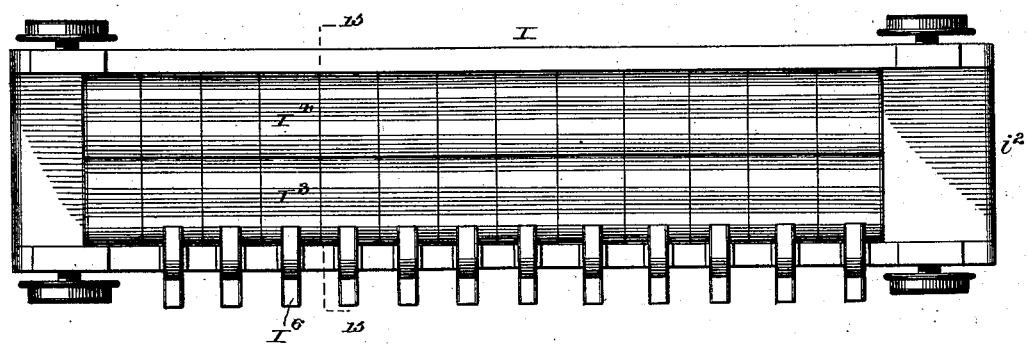
Fig. 14.
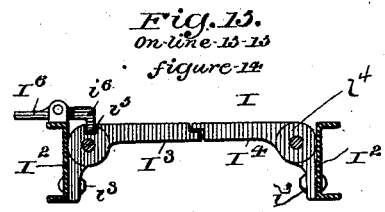
Fig. 13.
on line 15-15
figure 14.
WITNESSES:
Arthur Ashley
F. S. Elmore.
INVENTOR
David Baker
BY
Phil. T. Dodge
ATTORNEY.

(No Model.)  6 Sheets—Sheet 6.
D. BAKER.
CASTING APPARATUS OR PLANT.
No. 576,995.  Patented Feb. 16, 1897.
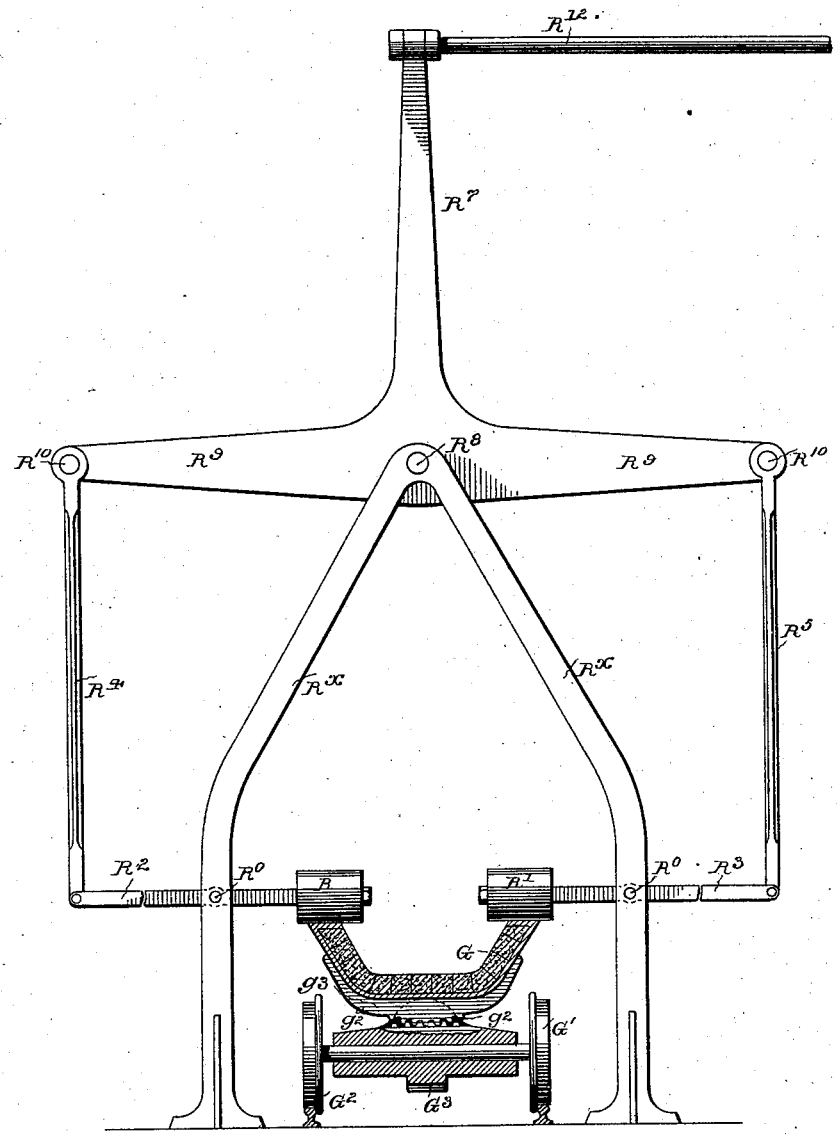

UNITED STATES PATENT OFFICE.

DAVID BAKER, OF SPARROW'S POINT, MARYLAND.

CASTING APPARATUS OR PLANT.

SPECIFICATION forming part of Letters Patent No. 576,995, dated February 16, 1897.

Application filed June 24, 1896. Serial No. 596,712. (No model.)

*To all whom it may concern:*

Be it known that I, DAVID BAKER, of Sparrow's Point, county of Baltimore, and State of Maryland, have invented a new and useful Improvement in Casting Apparatus or Plant, of which the following is a specification.

My invention relates to apparatus to be used in casting metal into pigs or plates.

The objects of my invention are to simplify, cheapen, and otherwise improve the existing forms of such an apparatus; to provide an apparatus in which the pigs will be kept clear from adhering sand and be given a regular shape; to provide an apparatus which will be capable of handling the metal from several furnaces and thereby materially lessen the cost of production; to provide an apparatus capable of use not only at an iron-producing furnace, but applicable for the casting of any metal into molds where it is desirable to have it in the form of pigs, ingots, or plates; also to improve the construction and arrangement of the molds; also to provide an improved pouring-basin; also to provide means between the molds and the dumping-cars to receive the shock of the pigs falling from the molds and direct the pigs upon the said cars; also to improve the construction of these dumping-cars; also to provide a spraying or cooling mechanism for the pigs when in place on the cars; also to improve the construction of the runner which conducts the molten metal from the pouring-basin to the molds.

The invention will be hereinafter fully described and then pointed out in the claims.

Figure 4:
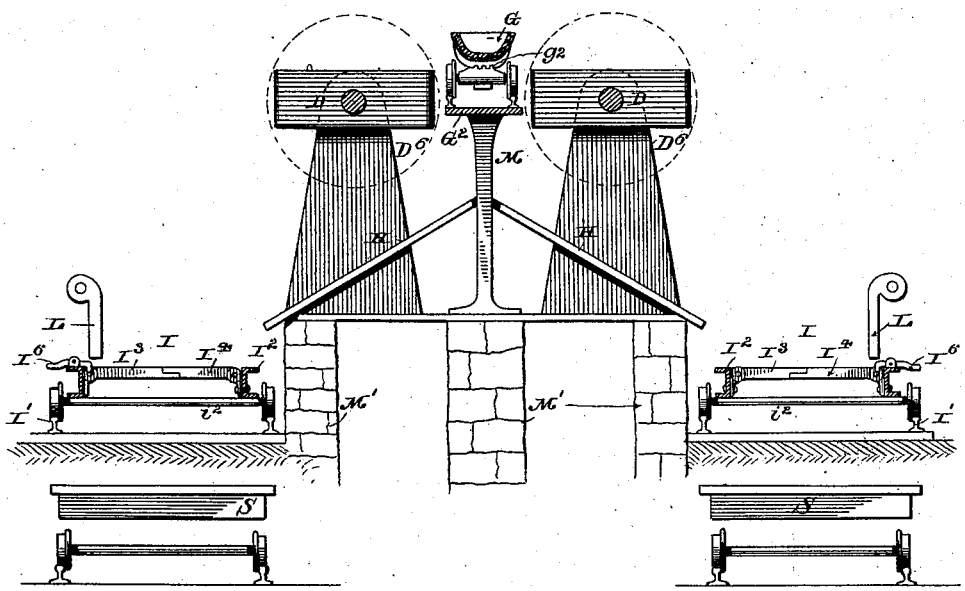
Figure 5:
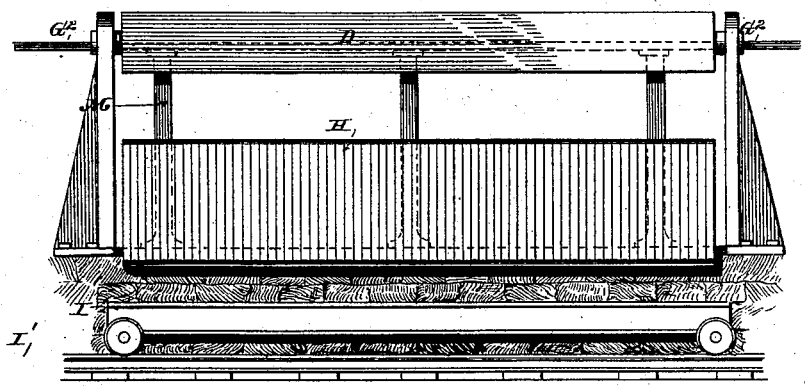

In the drawings, Figure 1 is a plan of the improved apparatus. Fig. 1$^a$ is a detail showing the mechanism for tilting the mold. Fig. 2 is a plan, on a larger scale, of the apparatus with the furnace omitted. Fig. 3 is a side elevation, partly in section, of Fig. 2. Fig. 4 is a transverse vertical section on line 4 4 of Fig. 2. Fig. 5 is a side elevation of the deflecting or shock-receiving plates and one of the dumping-cars. Fig. 6 is a plan of one of the beds of molds. Fig. 7 is a section on line 7 7 of Fig. 6. Fig. 8 is a plan of an individual mold. Fig. 9 is a section on line 9 9 of Fig. 8. Fig. 9$^a$ shows a pig in side and end elevation. Fig. 9$^b$ is a view similar to Fig. 9, but showing a rounded edge at $d^2$. Fig. 10 is a plan of the delivery end of the traveling runner. Fig. 11 is a side elevation thereof. Fig. 11$^a$ is a detail view showing how the operating-rack is secured to the traveling runner or truck thereof. Fig. 12 is a cross-section through the runner at one of its trucks and also showing a portion of the mechanism by which the runner is rocked or tilted to cause a discharge from either one of its pouring lips or spouts. Fig. 12$^a$ is a sectional elevation showing the runner and the mechanism for tilting it to discharge its contents. Fig. 13 is a side elevation of the pouring-basin and its operating mechanism. Fig. 14 is a plan of one of the dumping-cars, and Fig. 15 is a transverse section thereof on line 15 15 of Fig. 14.

This apparatus may be located in a cast-house, particularly where there are other furnaces of the same plant, but in the construction of a plant of furnaces for use with my apparatus only a very small cast-house will be necessary for each furnace, and the casting apparatus would then be preferably placed in a building by itself.

In the drawings the apparatus is shown as occupying part of the space in a cast-house of the usual size, a portion of the space being reserved for the construction of runners to conduct the iron from the furnace into the regular direct metal-ladles, which are then hauled, with those that may come from any other furnace of the plant, up an incline to the level of the cast-house floor by means of track C. This incline is not shown in the drawings. I do not restrict myself to this construction, for even in an old plant it may be desirable in some instances to put the casting apparatus in a building by itself.

A is an ordinary blast-furnace, of which there may be several, and B represents the walls of the cast-house in which my apparatus is located. C are the tracks on which furnace-ladle C' travels to carry the molten metal from the furnace or furnaces to the pouring-basin E. The ladle C' is pivoted in a frame C$^2$, mounted on a truck C$^3$, and may be tilted by hand or otherwise, as shown in Fig. 3, to discharge its contents into the said pouring-basin E. The basin E when receiving metal is tipped, so that there is depth enough of metal therein to prevent the metal being poured therein from spattering. Whenever liquid metal is poured into a bath of metal of sufficient depth there is no spattering, but if the metal is poured against a surface of clay or brick work it will spatter. The basin E is also for another purpose, as it should be large enough to hold whatever metal is left in the transporting-ladle C after the one side of or set of casting-molds has been filled. This will permit the ladle to be emptied quickly and thus prevent the metal from chilling on the sides of ladle, and it also provides a reservoir to hold the metal in case some of the mechanical appliances should get out of order.

The novelty resides in a movable pouring basin or reservoir capable of being tilted about the nose or outlet as a pivot in connecting with the runner and molds. This pouring-basin E is provided with a pouring nose or outlet E' at one side and is pivoted thereat to standards $e'$, as shown at $e^2$. (See Fig. 13.) These standards $e'$ are mounted at one side of the truck E, and the opposite side of the truck is provided with stops $e^3$, recessed at their upper ends to receive the stop-lugs $E^2$ at the rear end of the basin and on opposite sides thereof.

$E^3$ is a jointed cylinder, and $E^4$ is its piston-rod, which engages a lug $e^4$ on the rear end of the basin, so that the basin may be tilted thereby. (See Fig. 13.)

F is a short runner or trough which receives the molten metal from basin E and conducts it to the traveling and tilting runner G. The runner G is in the form of a trough and lined with fire-brick or refractory material, and has lateral discharge-spouts $g\ g'$ at opposite sides of its outer end.

G' are trucks on which the runner G is mounted, and these trucks travel on the inclined tracks $G^2$, situated in a lower plane than the pouring-vessel E. The runner G is connected to its trucks G' so as to rock or tilt thereon by means of transverse segmental gears $g^2$ on its lower side, which mesh into racks $g^{2a}$, formed on the upper sides of the truck-bolsters $g^3$, as best shown in Figs. 12 and $12^a$, and the several trucks G' are connected at their lower sides by a longitudinal rack $G^3$, with which meshes a drive-gear $G^5$, operated in any desired manner.

The tracks $G^2$ are supported on pillars or standards M M, which in turn rest on a suitable masonry or other foundation M'.

The runner-tilting mechanism comprises two rollers R R', which bear on the upper edges of the runner G, as shown in Figs. 12 and $12^a$. The rollers are mounted on the inner ends of two horizontal lever-arms $R^2$ and $R^3$, which are pivoted to standards $R^\times$ at $R^6$, which standards are connected at their upper ends. The outer ends of the lever-arms are pivoted to vertical links $R^4$ and $R^5$, which in turn are pivoted at their upper ends at $R^{10}$ to a horizontal rocking lever $R^9$. The rocking lever is mounted on a horizontal axis $R^8$ at the upper ends of the standards, and it is provided with a vertical arm $R^7$, having connected to its upper end an operating-rod $R^{12}$, by which it may be rocked on its axis to move the rollers in opposite directions vertically and thereby rock the runner G.

D D D D represent beds of molds, of which there may be any desired number, but, as shown in the drawings, a pair of these beds is placed at each side of the runner-track $G^2$, so that the pouring lips or spouts $g\ g'$ of the runner G will extend over the beds to supply the molds with metal. Each of these beds of molds D comprise a series of individual molds D', (see Figs. 6, 7, and 8,) and the metal-receiving recesses $d'$ in said molds are all wholly disconnected, so that the metal cannot run from one to the other, but every mold will be supplied in turn by the traveling runner G. The molds D' are rectangular in cross-section, so that their abutting flat side faces will lie close together, and the molding-recesses $d'$ incline from the bottom to the upper edges of their longitudinal sides, so that the longitudinal upper edges of the molds present virtually a knife-edge $d^2$. It follows, therefore, that as the metal is being poured into the molds from the traveling runner there will be no surface on which it can lodge. The edges $d^2$ may be rounded, if desired, and the result will be the same. (See Fig. $9^b$.) The ends of the molds D' are provided with extensions $d^3$, having apertures $d^4$, and longitudinal pipes or passages $d^5$ for a cooling fluid are also formed in the molds, if desired. A double reversible bed of molds is formed by parallel I-shaped channel-irons $D^2$, to the opposite edges of which are bolted a series of oppositely-facing molds D' by means of their extensions $d^6$ and bolts $d^6$, as shown in Fig. 7. As the backs of the two series of molds do not contact there is formed an air-chamber or passage which permits the molds to more readily cool.

$D^3$ are yokes bolted to the ends of the channel-irons $D^2$ and provided with trunnions $D^4$, which are journaled in suitable bearings $D^6$ and support the beds of molds, so that they may be overturned to dump the pigs, plates, or other molded articles. These trunnions $D^4$ are provided with gear wheels or pinions $d^7$, engaged by racks $d^8$, operated by the piston-rods $d^9$ of cylinders $D^9$, so that any bed of molds may be overturned to dump its contents wherever desired, but there will always be a series of molds uppermost to receive the molten metal.

H H are inclined corrugated plates beneath the beds of molds and supported at their inner upper edges by the pillars M and at their lower outer edges by masonry M', or otherwise, and beyond the lower edges of these plates H H and in a plane therebelow are situated the tracks I', on which travel the dumping-cars I. When the molds discharge the molded articles, they fall on the inclined corrugated plates H H, by which they are deflected and guided or directed upon the dumping-cars I. In order that the molded pigs, &c., may not accidentally slide off of the car I, there is placed a longitudinally-extending heavy buffer L above the outer rail of each track I', so that the car I may run thereunder, as shown in Fig. 4. These cars I are formed with a sectional deck or platform, so that their contents may be successively discharged upon the freight-cars S on tracks S' at the outer end of and below the tracks I'. The cars I are constructed as follows: $I^2 I^2$ are parallel channel-irons, mounted at their ends on trucks $i^3$ and provided along their inner faces with ears $i^3$, to which are hinged the ears $i^4$ on the outer ends of the heavy cast-iron deck or platform sections $I^3 I^4$. The sections $I^3 I^4$ are rabbeted at free ends, and the free ends of the sections $I^3$ extend under the free ends of the sections $I^4$ and hold the latter in their raised horizontal positions. The sections $I^3$ are provided at their hinged ends with notches $i^5$, which are engaged by the depending inner ends $i^6$ of the angular latches $I^6$, which are pivoted between their ends to the upper side of one of the channel-irons $I^2$. One of these latches $I^6$ is provided for every section $I^3$, and as the outer ends of said latches are successively depressed the deck-sections $I^3 I^4$ will be released and swing down and allow the contents of the car at that point to fall. This successive discharge of the pigs from cars I will greatly relieve the cars S and cause practically no injury to the floor, as only four or five pigs fall at a time and they strike horizontally.

In order that the pigs may be cooled while yet on dumping-cars, I provide spraying-pipes Z above the tracks I and at a point between the molding-beds and the railway-tracks S'.

The operation is as follows: The liquid metal is brought by the ladle C' to the pouring-basin E and poured therein. From the pouring-basin the metal is delivered by the short trough or runner F into the traveling runner G, which at that time will have its delivery spouts or lips $g$ $g'$ at one end of the series of mold-beds D. One of the rollers R R' will then be depressed to tilt the runner and cause its lip or spout $g$ or $g'$ to incline toward the adjacent mold-bed. The metal will be allowed to flow into each individual mold until filled, the traveling runner being moved longitudinally to bring its lip or spout $g$ or $g'$ successively over each mold. The rate of pouring may be timed so that by the time the runner G has filled the molds at one side, and, returning, filled the other, the first bed will have been dumped and will be ready for filling again, or the beds may be filled as rapidly as possible and pouring stopped until the metal is ready to be dumped, not over four minutes from the time the pouring was begun. As the molds taper to a sharp edge or curved surface, as heretofore described, no liquid metal can remain thereon, thus insuring the filling of the molds without the formation of scrap. As fast as the metal solidifies in the molds the beds are turned over to dump out the pigs, and either side of the bed may be brought uppermost for use at will. This operation continues until all of the metal has been cast. The "pigs" fall from the molds upon the corrugated plates H and slide thence upon the transfer or dumping cars I, by which they are brought under the spraying-pipes Z, and when cooled are discharged upon the freight-cars S.

I do not restrict myself to the exact constructions herein described, as the same may be varied considerably without departing from the scope of my invention.

Having thus described my invention, what I claim is—

1. In a casting apparatus, the combination with the longitudinally-traveling, tilting runner having oppositely-projecting discharge lips or spouts, of beds of non-communicating molds at opposite sides of the runner, substantially as set forth.

2. In a casting apparatus, the combination with the longitudinally-traveling, axially-tilting runner having oppositely-projecting pouring-outlets, of tilting, reversible beds of oppositely-facing molds at opposite sides of the runner, substantially as set forth.

3. The traveling runner having opposite discharging-outlets and provided with trucks on which it tilts.

4. The traveling runner having opposite discharging-outlets, and trucks supporting said runner, and geared thereto, to permit the runner to tilt and bring either discharge-outlet into operation, substantially as set forth.

5. The traveling runner having opposite discharging-outlets, trucks supporting the runner, and geared thereto, to permit the runner to tilt, in combination with a longitudinal rack connecting the trucks, and a gear-wheel engaging the rack to move the runner back and forth, substantially as set forth.

6. The combination with the tilting runner, of a lever mechanism having oppositely-operating arms projecting across the upper edges of the runner to depress either edge thereof, substantially as set forth.

7. The combination with the tilting runner, of a lever mechanism having oppositely-operating arms provided with rollers, engaging the upper edges of the runner to depress either edge thereof, substantially as set forth.

8. In a casting apparatus, the combination with the molds, of an inclined surface thereunder, to receive the articles discharged from the molds, a track below the lower edge of said inclined surface, a dumping-car thereon to receive the articles from the said inclined surface; said car having a sectional deck or platform to discharge the molded articles gradually, substantially as set forth.

9. In a casting plant or apparatus, the combination with the molds, the inclined surface thereunder, the track below the lower edge, of the said inclined surface, a transfer or dumping car on the track to receive the molded material from the inclined surface, and a guard or buffer above the track at the outer side of the car to prevent the falling articles from shooting off of the car, substantially as set forth.

10. In a casting plant or apparatus, the transfer or dumping car having its deck or platform divided into separate and independent series of sections hinged at their outer ends to the sides of the car to swing downwardly; the inner ends of the two series of sections overlapping and a series of latches along one side of the car and holding the adjacent series of deck or platform sections in their raised positions; said locked series in turn holding up the opposed series of sections, substantially as set forth.

11. In a casting plant or apparatus, a traveling and tilting runner, and tilting mold-beds at opposite sides thereof, of oppositely-inclined surfaces under said mold-beds to receive the articles discharged from the molds and direct them downwardly and outwardly, substantially as set forth.

12. In a casting plant or apparatus, the combination with the traveling and tilting runner, and the tilting mold-beds at opposite sides thereof, of the oppositely-inclined surfaces beneath said beds to receive the molded articles and guide them downwardly and outwardly and transfer-cars to receive the articles from said surfaces, substantially as set forth.

13. In a casting plant or apparatus, the combination with the traveling furnace-ladle, the tilting pouring-basin supplied thereby, and a short runner leading from the pouring-basin, of a traveling and tilting runner into which said short runner discharges, and beds of molds at opposite sides of the traveling runner, substantially as set forth.

14. A casting plant or apparatus, comprising the traveling furnace-ladle, the tilting pouring basin or reservoir supplied thereby, a short runner into which said basin discharges, a traveling and tilting runner into which said short runner discharges and provided with oppositely-discharging outlets means for operating the traveling runner, beds of tilting molds at opposite sides of the runner and provided with operating mechanisms for tilting them, inclined surfaces below said mold-beds and cars at the lower edges of the inclined surfaces to receive the molded articles therefrom and transfer them to the freight-cars or other point, substantially as set forth.

In testimony whereof I hereunto set my hand, this 17th day of June, 1896, in the presence of two attesting witnesses.

DAVID BAKER.

Witnesses:
GEO. H. WOOD,
JAS. D. WOODRUFF.